May 5, 1953  S. D. GEHMAN  2,637,203
APPARATUS FOR MEASURING STRESS RELAXATION
OF ELASTOMERIC MATERIALS

Filed Sept. 30, 1950  2 SHEETS—SHEET 1

*INVENTOR.*
SAMUEL D. GEHMAN
BY
*R. L. Miller*
ATTORNEY

May 5, 1953 S. D. GEHMAN 2,637,203
APPARATUS FOR MEASURING STRESS RELAXATION
OF ELASTOMERIC MATERIALS
Filed Sept. 30, 1950 2 SHEETS—SHEET 2

INVENTOR.
SAMUEL D. GEHMAN
BY
R. L. Miller
ATTORNEY

Patented May 5, 1953

2,637,203

UNITED STATES PATENT OFFICE 2,637,203

APPARATUS FOR MEASURING STRESS RELAXATION OF ELASTOMERIC MATERIALS

Samuel D. Gehman, Akron, Ohio, assignor to Wingfoot Corporation, Akron, Ohio, a corporation of Delaware Application September 30, 1950, Serial No. 187,715

6 Claims. (Cl. 73—89)

This invention relates to an apparatus for determining some of the physical characteristics of various materials. More particularly, the present invention provides an apparatus that is useful for studying the rate of stress relaxation of resilient material under compression.

It is therefore an object of this invention to provide a very simple and inexpensive apparatus for conducting such studies.

Another object of the invention is to provide a testing apparatus the results of the use of which are consistent and readily reproducible in later tests.

A still further object is to provide an apparatus that functions substantially automatically so that little of the individual's time is required to conduct the tests.

A particular object of the invention is to provide an apparatus for testing materials that is self-contained and requires a minimum of space.

Another object of the invention is to provide a modification which embodies a different form of apparatus to study the stress relaxation properties of resilient materials.

Other objects and advantages of this invention will become apparent hereinafter as the description thereof proceeds, the novel features, arrangements and combinations being clearly pointed out in the specification as well as in the claims thereunto appended.

There is a widespread demand today for articles such as gaskets, compression types of mounting, etc, in which the material used is resilient and subjected to compression in use. Rubber including material and all the types of synthetic rubbers are typical materials used for these articles. In order that the most suitable material may be used in their construction, a determination of the stress relaxation properties of the various available materials must be made. A resilient material when subjected to continued compression tends to relax gradually and consequently exerts less and less force so that in some instances the article will not continue to function properly or will become unsatisfactory because of the reduced stress. Stated in another way, the stress required to maintain a resilient material at a fixed deformation is gradually reduced over a period of time.

One method of determining the rate and amount of the stress relaxation or decay of a material is to retain samples of the material at a fixed deformation for a predetermined period of time. By observing periodically the amount of stress exerted by the material in order to maintain this deformation, the characteristics of the particular material may be established. By comparing the characteristics of the different materials, it is possible then to determine the most suitable material to meet the requirements of the specific use.

Figures 1, 2:
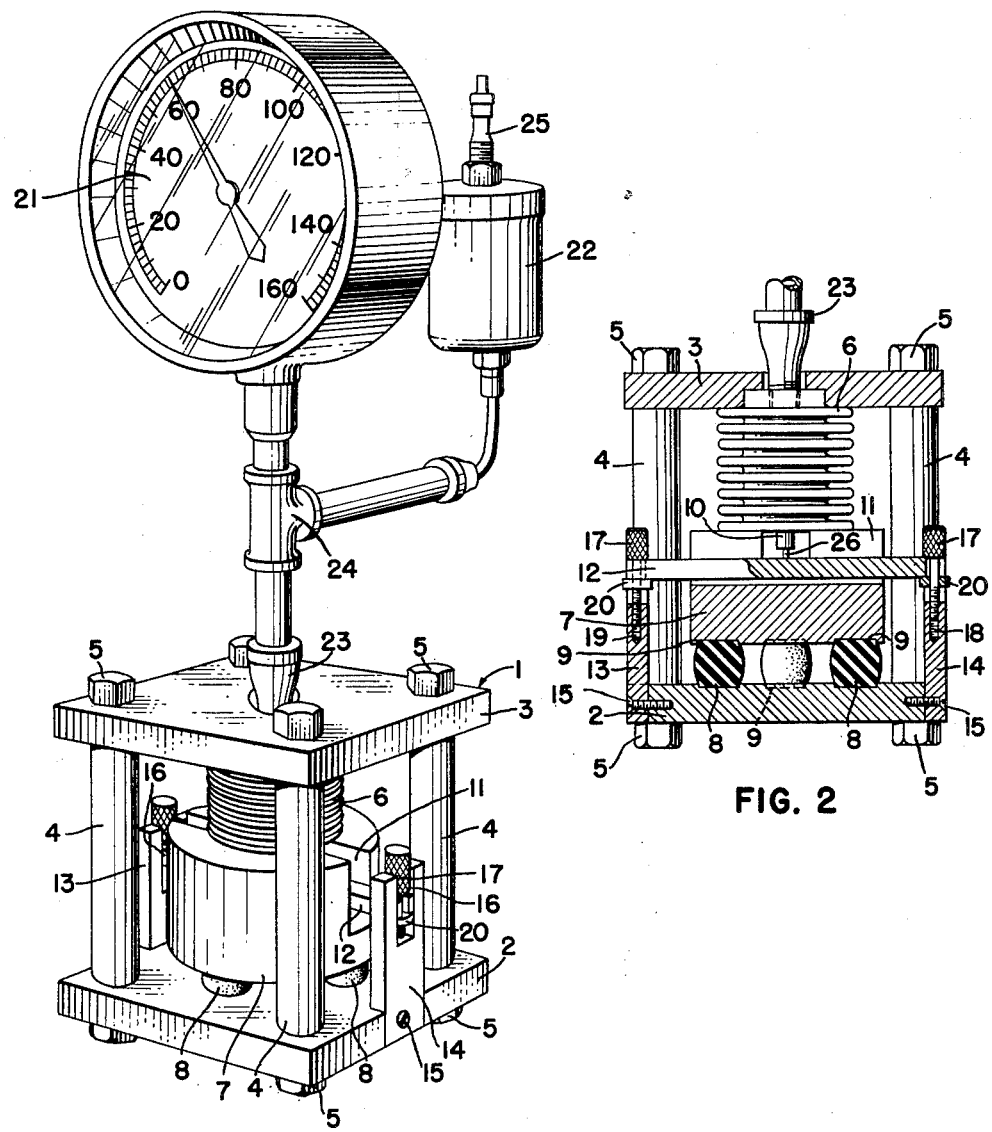
Fig. 1 is a perspective view of the apparatus.
Fig. 2 is a sectional view of a portion of the apparatus.

In Figs. 1 and 2, the framework 1 consists of a bottom plate 2 and top plate 3 held in spaced apart relation by the column members 4 and cap screws 5. An expansible pneumatic chamber 6, preferably a Sylphon bellows, is interposed between the top plate 3 and the load applying member 7. When pneumatic pressure is applied to the chamber 6, the chamber extends to force the load applying member 7 downwardly toward the base plate 2, thereby compressing the specimens 8 of the material held between plate 2 and load applying member 7. In order to locate accurately and to distribute evenly the load on the samples, it is desirable, although not necessary, to provide shallow recesses 9 in the plate 2 and member 7 to receive the ends of the specimens 8.

A valve 10, preferably an ordinary tire valve (see Fig. 2), is mounted on the lower end of the bellows 6 and extending downwardly into the groove 11 formed in the load applying member 7. In order to automatically adjust the pressure in the bellows 6 as the stress in the specimens 8 relaxes or decays, in order that a constant deformation may be maintained on the test specimens 8, a bar member 12, extending through the groove 11 of the load applying member 7, is adjustably mounted on the base plate 2 of the apparatus.

One method of mounting the bar 12 as illustrated in Fig. 2 is to provide the upright supporting members 13 and 14, fastened to the base 2 by screws 15. A vertically extending slot 16 is provided on the upper portion of the supporting members 13, 14, the slot being of sufficient width to allow the bar 12 to move up and down freely. Knurl headed adjusting screws 17, adapted to be received by the tapped holes 18 and 19 in supporting members 13 and 14 respectively, have a shoulder portion 20 spaced below the knurled head portion. The slotted ends of bar 12 are adapted to be placed between the shoulder 20 and the head of the adjusting screws 17.

A pressure indicating gauge 21 such, for example, as a Bourdon gauge, and an air chamber 22 are attached to the upper end of the bellows 6 by means of a pipe nipple 23 through a pipe T 24. A pump (not shown), preferably a hand pump, is attached to the valve 25 on air chamber 22 to supply pneumatic pressure to the bellows 6. In order that the test results may be as accurate as possible, it is advisable to make certain that the critical joints are airtight.

In operation of the apparatus, accurately sized specimens 8 of the material to be tested are placed between the plate 2 and load member 7 in the appropriate recesses 9. As pressure is applied to the bellows 6, the bellows extends, forcing the member 7 downwardly, causing the specimens 8 to be compressed. If the recesses 9 are not provided, the ends of the specimens 8 should be lightly roughened with crocus cloth before placing in the apparatus.

The amount of initial deformation desired is predetermined, then pressure is applied to the bellows until this deformation of the specimens is obtained. The deformation may be measured by a micrometer or micrometer dial gauge attached to the apparatus. When the desired deformation is attained, the height of bar 12 is adjusted so as to just contact the end of the core 26 of the valve 10. The adjusting screws 16 and 17 are used to adjust the height of the bar 12.

As the stress in the specimens 8 relaxes, the load applying member 7 tends to move downwardly as the specimens offer less resistance to the pressure in the bellows 6. When this occurs, the bar 12 prevents the core 26 from moving downwardly so any downward movement of the member 7 causes the core 26 in the valve 10 to open to release sufficient pressure in order that the established deformation is maintained. By noting the readings of the pressure gauge 21 at stated intervals, a measurement of the rate and amount of the stress relaxation or decay can be determined.

Any number of specimens may be subjected to the test but for the purposes of illustration, recesses have been provided in the bottom plate and load applying member for receiving four specimens. It is highly desirable to test more than one specimen at a time because it will eliminate or reduce to a minimum some of the uncontrollable variables in a test of this nature and also produce an average in one test rather than obtaining one by conducting multiple tests.

Figure 4:
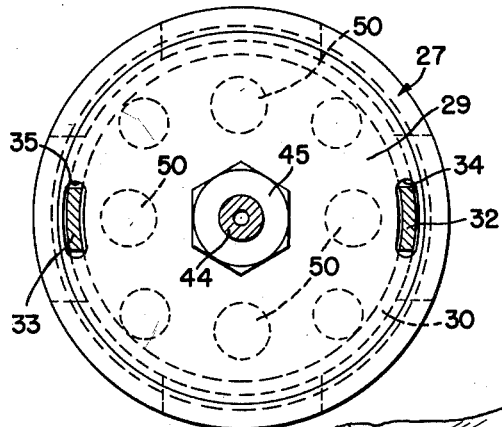
Fig. 4 is a partial section taken along line 4—4 of Fig. 3.
Figure 5:
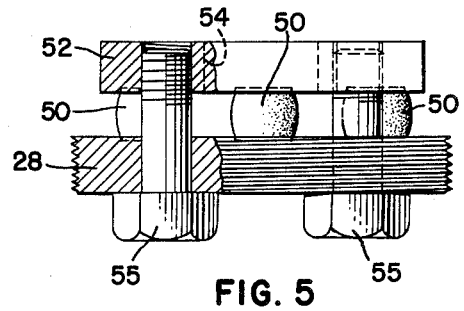
Fig. 5 is a detailed partial sectional view of a portion of the modification shown in Fig. 3.
Figure 3:
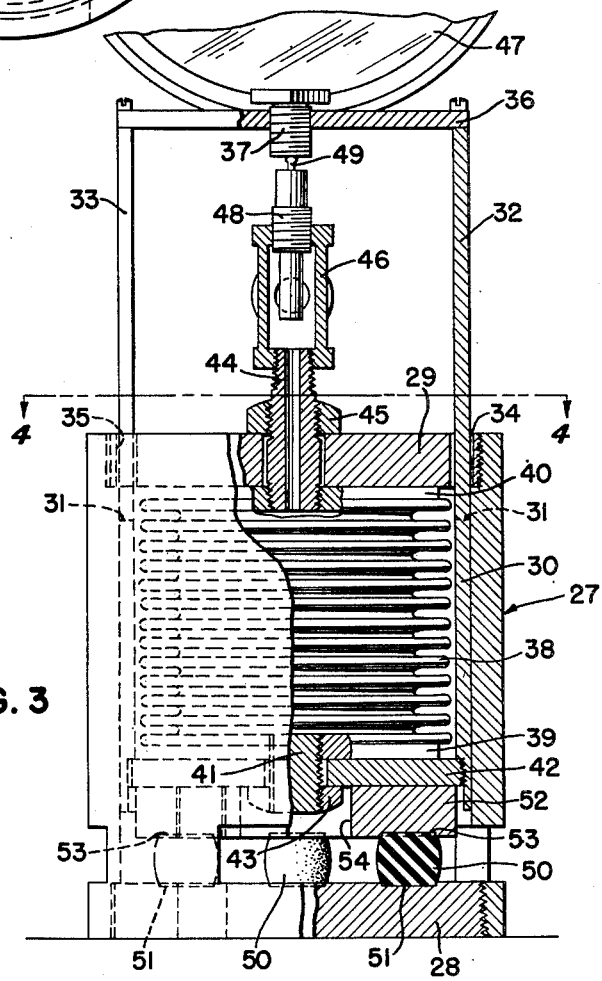
Fig. 3 is a sectional view of a modification of the invention.

In Figs. 3, 4 and 5, a modified form of the invention is illustrated in which the automatic pressure adjusting mechanism is more easily accessible. A cylindrical outer shell 27 is counter-bored and threaded at each end to receive the end plugs 28 and 29. Portions of the outer shell 27 are removed above the bottom plug 28 to provide openings through which the specimens being tested may be observed. Interiorly of the shell 27, a cylindrical member 30 is provided with sufficient clearance so that it will move relative to the wall of shell 27 without friction.

The upper wall portion of member 30 is partially removed to a point 31 below the top plug 29 so as to form two yoke portions 32 and 33. The yoke portions 32 and 33 are arcuately shaped and extend upwardly through the openings 34 and 35 of the top plug 29 (see Fig. 4) and a cross member 36 joins the members 32 and 33. An adjusting screw 37, whose function will be described later, is inserted in the tapped opening in the center of cross member 36.

The pressure applying member is an expansible bellows 38 similar to that previously described. Each end of the bellows 38 is tightly secured to the closure members 39 and 40 and moves freely up and down interiorly of cylindrical member 30. Each member 39 and 40 is provided with a tapped opening in its central portion.

A solid plug 41 is inserted in the tapped opening of the lower member 39 so that it extends downward through the opening in the lower plate 42 of the cylindrical member 30. The plate 42 is securely fastened to the member 39 by means of the threads around its outer periphery. After the plate 42 is threaded into member 39, a nut 43 is applied to the plug 42 and securely tightened.

A hollow nipple 44 is inserted in the threaded opening of the upper plate 40 and extending upwardly through the end plug 29. The upper plate 40 is securely anchored to the end plug 29 by means of the nut 45. A T fitting 46 is then applied to the outermost end of the nipple 44. A pressure indicating device 47, such as a Bourdon gauge, is connected to the leg of the T and the upper end of the T contains the valve 48 with a movable valve core 49.

In conducting a test with this apparatus, the bottom end plug 28 is removed from the shell 27 and the specimens 50 to be tested are placed in the recesses 51 provided in the upper surface of the plug. The load applying member 52 is then placed in position on the samples with the upper end of the samples extending into the recesses 53 on the lower surface of the member 52. A central opening 54 provides clearance for the nut 43 so that the upper surface of the load applying member 52 may contact the lower surface of plate 42. The entire assembly of the plug 28, specimens 50, and member 52 is then placed in position in the apparatus by engaging the threads on the outer periphery of plug 28 with those in the shell 27.

In the manner previously described, pressure is then supplied to the bellows member 38 through the valve 48 sufficient to produce the predetermined deformation of the specimens 50. The adjusting screw 37 is then turned until it contacts the valve core 49. As the specimens are retained under pressure, the stresses in the specimens relax so that the load applying member 52, the plate 42, the closure member 39, the cylindrical member 30 including the yoke cross-member 36 and screw 37 start to move downwardly relative to the shell 27, the valve 48 and valve core 49. As this movement takes place, the screw 37 pushes the valve core 49 down, which releases sufficient pressure in the bellows 38 to maintain the specimens under the predetermined deformation. The readings of the pressure gauge 47 at predetermined intervals can be used to determine the rate of stress relaxation.

Fig. 4 illustrates another feature of the modification of the apparatus shown in Fig. 3 which allows the specimens 50 to be held under the predetermined deformation without tying up the apparatus for extended periods of time. The specimens 50 are placed under the predetermined deformation in the above-described manner and then cap screws 55 are inserted through the openings in the bottom end plug 28 to engage the threaded openings in the load applying member 52. The cap screws 55 are then drawn up until the pressure begins to change as indicated by the pressure gauge 47.

The assembly of the end plug 28, pressure applying member 52 and the specimens 50 is then removed from the apparatus by unscrewing the bottom plug 28 from the outer shell 27. This assembly can then be aged, subjected to heat in an oven or subjected to any other conditions desired, after which the assembly is then reinserted in the apparatus and the cap screws 55 are removed. Sufficient pressure is then applied to again produce the predetermined deformation.

A comparison of this latter pressure with the initial pressure that produced the deformation will give an indication of the amount of stress relaxation or decay occurring in the specimens during the period of the test. Similarly, any number of tests can be conducted simultaneously, it being only necessary to have additional bottom plugs 28 and load applying members 52 for use with the other specimens.

If the various groups of specimens 50 that are tested are of the same height, it is not necessary to adjust the seating of the adjusting screw 37 when the different groups of specimens are tested. After the specimens are compressed to the predetermined deformation and the cap screws 55 are drawn up, the assembly is removed as previously described. When the assembly is reinserted in the machine, pressure is applied to the specimens until the adjusting screw 37 relieves the pressure by depressing the valve core 49 which, of course, is an indication that the specimens have reached the initial predetermined deformation. The cap screws 54 are then removed and the readings of the pressure gauge taken.

While certain representative embodiments and details have been shown for the purpose of illustrating the invention, it will be apparent to those skilled in the art that various changes and modifications may be made therein without departing from the spirit or scope of the invention.

I claim:

1. An apparatus for determining the stress relaxation of a material in compression, said apparatus comprising means for subjecting a specimen of said material to a predetermined deformation, said means including a pressure applying member, a sylphonic-type pneumatic chamber attached to said pressure applying member, a relief valve attached to and movable with said chamber, a control member adapted to operate said valve when said pneumatic chamber and pressure chamber move beyond a predetermined point whereby the pressure in said chamber is relieved and said pressure applying member is maintained in substantially the same position, and a pressure indicating device on said pneumatic chamber.

2. Apparatus for determining the stress relaxation of a material in compression, said apparatus comprising a pair of relatively movable members, a sylphonic-type pneumatic chamber to move one of said members to apply pressure to a test specimen of said material and means for maintaining the specimen at a constant deformation, said means comprising a relief valve attached to and movable with said pneumatic chamber, a control member adapted to operate said valve when said pneumatic chamber and pressure-applying member move beyond a predetermined point whereby the pneumatic pressure is regulated to maintain the deformation of the specimen substantially constant, and a pressure indicating device on said pneumatic chamber.

3. Apparatus for determining the stress relaxation of a material in compression, said apparatus comprising means for applying pressure to the specimen embodying a reciprocably mounted member and a sylphonic-type pneumatic chamber, a fixed member for receiving a specimen of said material and cooperating with said reciprocably mounted member for applying compressive stress to said specimen, a relief valve mounted on and movable with said pneumatic chamber, a valve control member adapted to operate said valve when said pneumatic chamber and reciprocably mounted member move beyond a predetermined point whereby the pressure in said pneumatic chamber is regulated to maintain the specimen at a substantially constant deformation, and a pressure indicating device connected to the pneumatic chamber.

4. Apparatus for determining the stress relaxation of a material in compression, said apparatus comprising means for applying pressure to the specimen embodying a reciprocably mounted member and an expansible metal bellows pneumatic chamber, a fixed member for receiving a specimen of said material and cooperating with said reciprocably mounted member for applying compressive stress to said specimen, a relief valve mounted on and movable with said pneumatic chamber, a valve control member adapted to operate said valve when the reciprocably mounted member and pneumatic chamber move beyond a predetermined point whereby the pressure in said pneumatic chamber is regulated to maintain the specimen at a substantially constant deformation, means for adjusting said control member, and a pressure indicating device connected to the pneumatic chamber.

5. Apparatus for determining the stress relaxation of a material in compression, said apparatus comprising a framework having spaced apart bottom and top plates, said bottom plate supporting the specimen of material to be tested, a reciprocably mounted load applying member, an expansible sylphonic-type pneumatic chamber between said load applying member and said top plate for applying pressure to said load applying member to compress said specimen, a valve mounted on and movable with said pneumatic chamber, a control member adjustably mounted in said framework and adapted to operate said valve when said load-applying member and pneumatic chamber move beyond a predetermined point, means to supply pressure to said pneumatic chamber, and a pressure indicating device connected to said pneumatic chamber.

6. Apparatus for determining the stress relaxation of a material in compression, said apparatus comprising means for mounting the specimen to be tested, an expansible bellows pneumatic chamber cooperating with the mounting means for subjecting the specimen to compressive stress, a relief valve mounted on and movable with said chamber, means adapted to operate the valve when the pneumatic chamber and valve are moved past a predetermined point, means for adjusting the position of the valve operating means, and a pressure indicating device connected to the pneumatic chamber.

SAMUEL D. GEHMAN.

References Cited in the file of this patent

UNITED STATES PATENTS

| Number | Name | Date |
|---|---|---|
| 1,192,670 | Moore et al. | July 25, 1916 |
| 1,367,133 | Guillery | Feb. 1, 1921 |
| 2,436,317 | Manjoine | Feb. 17, 1948 |
| 2,482,147 | Bashore | Sept. 20, 1949 |